United States Patent
Sylvester et al.

(10) Patent No.: US 7,340,166 B1
(45) Date of Patent: Mar. 4, 2008

(54) METHODS AND APPARATUS FOR AUTOMATED TESTING AND ANALYSIS OF DENSE WAVELENGTH DIVISION MULTIPLEXING (DWDM), WAVELENGTH SELECTIVE AND/OR OPTICAL SWITCHING DEVICES

(75) Inventors: James E. Sylvester, McLean, VA (US); Gaston S. Ormazabal, New York, NY (US); Lily F. Chen, Fort Lee, NJ (US); Dimitrios Kokkinos, Flushing, NY (US)

(73) Assignee: Verizon Services Corp., Arlington, VA (US)

( * ) Notice: Subject to any disclaimer, the term of this patent is extended or adjusted under 35 U.S.C. 154(b) by 535 days.

(21) Appl. No.: 10/892,072

(22) Filed: Jul. 15, 2004

(51) Int. Cl.
  *H04J 14/08* (2006.01)
(52) U.S. Cl. .......................... 398/45; 398/98
(58) Field of Classification Search ................ 398/98, 398/45
  See application file for complete search history.

(56) References Cited

U.S. PATENT DOCUMENTS 5,991,270 A * 11/1999 Zwan et al. ................ 370/249

* cited by examiner

*Primary Examiner*—Leslie Pascal (57) ABSTRACT

A system for performing testing and analysis of a DWDM optical switch in a computer controlled, automated manner for switches from multiple vendors is described. The introduction of automation of the testing configuration and the extensive use of protocol adaptation to provide a consistent user interface for the test apparatus across multiple vendor implementations through the use of programmable adapter modules facilitates systematic and efficient testing. Proper functionality of a given optical switch implementation, quantification of a system's parameters and determination of switching performance measures can be obtained. Capabilities are built into the analysis engine for the determination of Service Level Agreement (SLA) parameters that can be provided for the optical layer or as input to calculations of SLA at higher-level protocols. The automated apparatus provides an efficient tool for evaluating and comparing DWDM optical switching devices, e.g., devices from different manufactures, which use different switch control protocols.

22 Claims, 8 Drawing Sheets

METHODS AND APPARATUS FOR AUTOMATED TESTING AND ANALYSIS OF DENSE WAVELENGTH DIVISION MULTIPLEXING (DWDM), WAVELENGTH SELECTIVE AND/OR OPTICAL SWITCHING DEVICES

FIELD OF THE INVENTION

The present invention relates generally to the field of optical communications systems and, more particularly, to the field of automated testing of Dense Wavelength Division Multiplexing (DWDM) optical switches and analysis of test results.

BACKGROUND

Dense Wavelength Division Multiplexing (DWDM) is a technology that is increasing in popularity among communications technology leaders in finance, healthcare, government and education research thus impacting the future deployment plans of large communications service providers. The deployment of DWDM technology can increase the capacity over existing optical communications links and networks, e.g., those using single mode fiber, while adding network flexibility to allow for the almost instant adjustment and/or expansion in bandwidth at points in the network where needed.

DWDM technology involves the packing of multiple wavelengths of light onto a single physical fiber thus providing a large multiplexing factor over standard single mode fiber. The multiplexing of multiple wavelengths onto a single physical interface has led to the possibility of routing and switching at the wavelength level across various stages of a network permitting a more efficient use of the total bandwidth by providing the capability to dynamically allocate resources as needed.

Recent advances in switching technology for optical systems have made service provider deployment of these DWDM technology systems more realistic, resulting in the need to test these systems and system components against performance benchmarks to validate the claims of a given manufacturer and comparatively evaluate similar equipment from different manufactures. It is in the interest of communication service providers, who select, purchase, deploy, and use DWDM equipment and/or switching elements from various manufacturers, to characterize accurately a system's performance, before the introduction of a new network element into the network. It would also be advantageous if these tests could be performed in an automated, systematic, cost effective, and as speedy a manner as possible. Furthermore, while optical switching systems and elements from various manufacturers operate roughly in the same manner in principle, in reality, many of the vendors rely on proprietary protocols, particularly over their control and/or test interfaces, that make testing very difficult and cumbersome. Seemingly identical tasks have to be mapped out differently for each vendor's device, and the testing has to be repeated manually. In addition, the testing devices have to be reprogrammed individually to fit the specific requirements, e.g., number of ports, dynamic ranges, operational optical interfaces, control/test interface(s), control/test protocol, and test options, corresponding to a given vendor device.

In view of the above discussion, it is apparent that there is a need for methods and apparatus to provide an integrated testing tool that packages a number of hardware and software components, as well as protocol adapters for each vendor's technology. Methods and apparatus that supply an analytical engine that permits automatic test configuration set up, test execution, collection of test results and analysis of these results, presenting them to the tester in a unified manner, e.g., a Graphical User Interface (GUI)-based interface, would also be beneficial. Communication system service providers can benefit from cost effective and timesaving tools that will more efficiently allow the evaluation and testing of new DWDM network elements, from various vendors, before these elements are introduced into the network. In addition, as various deployed DWDM elements age, system and/or performance parameters may degrade. An automated, well controlled testing system with data retention capability would allow for periodic testing and evaluation of deployed devices to identify potential degradations and allow corrective actions to be taken before critical parameters exceed allowable limits.

SUMMARY

Various features of the present invention are directed to methods and apparatus for testing and analyzing that permits verification of the performance of dense wavelength division multiplexing (DWDM) devices, wavelength selective and/or optical switching devices. Optical switching devices perform optical switching operations while wavelength selective devices are used to select one or more wavelength from multiple wavelengths. DWDM optical switching devices usually include optical switching functionality in combination with wavelength selection capability. In various exemplary embodiments, the invention is directed to a system for testing a DWDM optical switch device in a computer controlled, automated environment for multiple vendor implementations. The DWDM testing and analysis apparatus of the present invention offers a solution to the difficulties in verifying the function and performance of a DWDM optical switching device in a systematic and efficient manner across multiple vendors. Embodiments of the present invention provide automation of the testing configuration and extensively use protocol adaptation across multiple vendor implementations through the use of conversion modules programmed and software-integrated into the analysis engine tool. Features of the present invention include testing methodology that may be used to verify the proper functioning of a given optical switch implementation. This verification also includes the quantification of a system's parameters and determination of switching performance measures, e.g., timing. Additionally, in some embodiments, capabilities are built into the analysis engine, of the present invention, for the determination of Service Level Agreement (SLA) parameters that can be provided for the optical layer or as input to calculations of SLA at higher-level protocols.

New vendors' products can be promptly evaluated in a shorter time interval by using the present invention, over the time presently required to perform an equivalent evaluation using presently employed methods and apparatus. This increase in the speed of an evaluation, provided by the present invention, represents significant value added by this invention in terms of time savings, and manpower savings. In addition, by providing a more systematic, controlled, and efficient DWDM wavelength switch testing approach, a service provider may obtain a better comparative evaluation, test a larger sample of switches, and track changes, e.g., degradations in deployed switches over time.

Various system parameters that can be measured, examined, compared, and evaluated through testing, in accordance with various embodiments of the present invention, include:

1. Switch Timing
   Switching Time
   Switching Speed (number of switches per second)
   Full Switch Capacity
2. Spectral Attenuation
3. Insertion Loss
4. Chromatic Dispersion
5. Polarization Mode Dispersion (PMD)
6. Polarization Dependent Loss (PDL)
7. Optical Return Loss (ORL)
8. Optical Power Range (e.g., maximum/minimum optical power per port)
9. Isolation
10. Directivity
11. Cross-talk Adjacent Channels
12. Cross-talk Non-adjacent Channels Additionally, performance parameters that can be measured through testing, in accordance with various embodiments of the invention include:

1. Bit-error rate (BER)
2. Optical Signal-to-Noise Ratio (OSNR).

Currently, the few available testing systems used to obtain measurements on the above parameters consist of a collection of devices that are used largely in a manual fashion and are, therefore, cumbersome and extremely time-consuming to use. Furthermore, because of the nature of the optical systems available today, the interfaces to the optical switching devices are proprietary and therefore the associated testing devices are custom designed for a particular manufacturer's system and are typically not reusable to test another manufacturer's device.

The invention is directed toward methods and apparatus obtaining measurements of the above parameters in an automated, user friendly, and time efficient fashion in a well controlled testing environment.

Various embodiments of the present invention, are directed toward an Integrated Testing and Analysis System for a Wavelength Selective Switch (ITASWSS) that include the following component modules:
   Wavelength Generators
   Wavelength Detectors
   Internal Switching Device(s)
   BER/OSNR Testing Modules
   Multiple Protocol Adapters
   An Analytical Engine.

In some embodiments, of the present invention, the testing system used to evaluate an optical switching device, e.g., a DWDM wavelength switch, uses a dual ITASWSS testing configuration, with a first ITASWSS being used for wavelength generation at the originating end and a second ITASWSS acting as a wavelength analyzer at the target end. In some embodiments, the first ITASWSS may act as a master, controlling and synchronizing testing overall operations, while the second ITASWSS may act as a slave, responding to direction from the first ITASWSS. Test signals, e.g., information at various wavelengths are generated, and launched at the originating end by the first ITASWSS. The signals, grouped into sets, are routed into the wavelength switch, e.g., through multiple input ports, each input port supporting many, e.g., 10, 20, 40 or more wavelengths. The wavelength switch may switch information onto different wavelengths, switch wavelengths, and group wavelengths as sets onto designated output ports. The wavelength switch operation is controlled by the first ITASWSS. At the target end, the output signals from the wavelength switch are input to the second ITASWSS. The second ITASWSS receives the signals which have been processed by the wavelength switch. The second ITASWSS performs detection and information recovery on the received signals. The ITASWSSs of the testing system can determine what portion of the launched signals and information was able to traverse the switch under what conditions. The ITASWSSs of the testing system can determine how the signals and information were altered, e.g., degraded, due to traversing the wavelength switch, and under what conditions. This testing may be performed automatically in stages to fine tune the granularity of the measurements.

In some embodiments, ITASWSSs are implemented with additional capabilities such as: establishing SLA benchmarks at the physical (optical) layer, developing estimations about the impacts that the measured optical switching impairments may have on higher level protocols, retaining a database of information on tested switches, and generating comparison reports.

The ITASWSS, in accordance with the invention, is easily updated to allow for new variations of wavelength switches and new protocols which may be employed.

In some testing embodiments, a single ITASWSS performs both test signal origination functions, test signal detection function, and evaluation functions, and a second ITASWSS is not used to evaluate a wavelength switch.

In some embodiments, the testing system may include the capability to test and evaluate other system components and/or sets of components used in DWDM networks, e.g., DWDM devices, fiber, cables, splitters, attenuators, gain devices, repeaters, transmitters, receivers, etc.

In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

DETAILED DESCRIPTION

Figure 1:
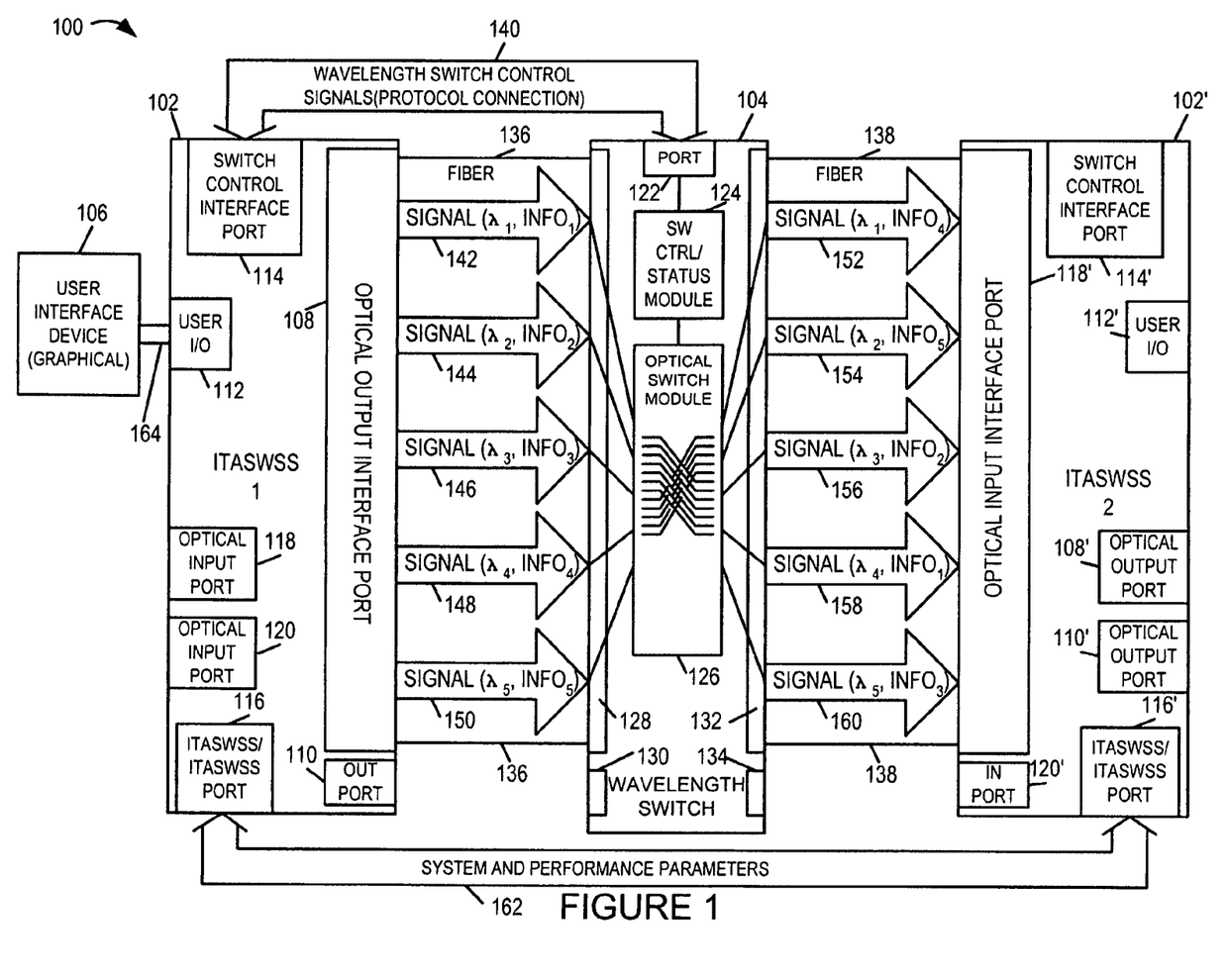
FIG. 1 is a drawing illustrating an exemplary dual ITASWSS configuration test system for testing and analyzing DWDM wavelength switches, in accordance with the present invention.

FIG. 1 is a drawing illustrating an exemplary test system 100 implemented in accordance with the present invention and using methods of the present invention. Exemplary test system 100 includes a first ITASWSS 102 coupled to a DWDM wavelength switch 104, a second ITASWSS 102', and a user interface device 106. ITASWSS #1 102 includes a first optical output interface port 108, a second optical interface output port 110, a user I/O port 112, a switch control interface port 114, an ITASWSS/ITASWSS port 116, a first optical interface input port 118 and a second optical interface input port 120. DWDM wavelength switch 104 includes a switch control interface port 122, a software control/status module 124, an optical switch module 126, a first optical input interface port 128, a second optical input interface port 130, a first optical interface output interface port 132, and a second optical interface output port 134. ITASWSS#2 102' includes a first optical input interface port 118', a second optical interface input port 120', an ITASWSS/ITASWSS interface port 116', a switch control interface port 114', a user I/O port 112', a first optical output interface port 108', and a second optical output interface port 110'.

The exemplary DWDM wavelength switch 104 is the unit under test, e.g., a specific vendor's optical switching device being evaluated. ITASWSS #1 102, being used as a test signaling source and test controlling device, is coupled to the DWDM wavelength switch 104 via optical link 136. ITASWSS#2 102', being used as a test signaling receiver is coupled to DWDM wavelength switch 104 via optical link 138. Optical links 136, 138 may be, e.g., optical fibers, with connectors at each end allowing coupling to an optical port, 108, 110, 128, 130, 132, 134, 118', 120', 108', 110'. In system 100 optical link 136 couples port 108 to port 128, and optical link 138 couples port 132 to port 118'. Switch control interface ports 114, 122 are coupled together via bus 140 over which wavelength switching control signals, responses, and test information may flow. Signaling through bus 140 uses a protocol instruction set specific to the optical wavelength switch 104 under test. Switch control signaling received through port 122 is directed to the switch control/status module 124 which processes the command instructions and controls the operation of the optical switch module 126. Optical switch module 126, when commanded, switches for a plurality of wavelengths, received information signals modulated on one wavelength to a different wavelength.

FIG. 1 shows five exemplary input test signals (142, 144, 146, 148, 150) being conveyed from ITASWSS #1 102 in fiber 136 to wavelength switch 104. Five exemplary output test signals (152, 154, 156, 158, 160) are conveyed from wavelength switch 104 to ITASWSS #2 102' via optical fiber 138. Each wavelength may be viewed as a separate channel acting as a separate pipe for conveying information. Sets of information to be conveyed may be modulated on each wavelength, by ITASWSS #1 102. First input test signal 142 represents information set 1 modulated on wavelength 1; second input test signal 144 represents information set 2 modulated on wavelength 2; third input test signal 146 represents information set 3 modulated on wavelength 3; fourth input test signal 148 represents information set 4 modulated on wavelength 4; fifth input test signal 150 represents information set 5 modulated on wavelength 5. The optical switch module 126 interchanges, e.g., swaps or remaps information sets between the wavelengths as directed by switch control/status module 124. For example, in FIG. 1, first output test signal 152 represents information set 4 modulated on wavelength 1; second output test signal 154 represents information set 5 modulated on wavelength 2; third output test signal 156 represents information set 2 modulated on wavelength 3; fourth output test signal 158 represents information set 1 modulated on wavelength 4; and fifth output test signal 160 represents information set 3 modulated on wavelength 5.

ITASWSS #2 102' receives the output signals 152, 154, 156, 158, and 160, via optical input interface port 118', and evaluates the received signals in terms of system and performance criteria, e.g., switching rate, attenuation, error rate, etc.

ITASWSS #2 102' conveys raw measurement information and/or evaluation information, e.g., system and performance related parameters, to the ITASWSS#1 102 out through ITASWSS/ITASWSS interface port 116' over bus 162 to ITASWSS/ITASWSS interface port 116. In some embodiments, ITASWSSs 1 and 2 (102, 102') shall operate in a master/slave relationship. For example, ITASWSS #1 102 may control testing operations, e.g., test sequence, test configuration, test timing, etc., and may send configuration and timing synchronization messages to ITASWSS #2 102' over bus 162.

User I/O interface 112 in ITASWSS 1 102 is coupled via bus 164 to the user interface device 106. The user interface device 106, e.g., a personal computer station including a graphical interface capability, allows a test operator to input configuration information on the unit under test, DWDM wavelength switch 104, e.g., vendor, model number part number, S/N, etc., so the ITASWSS #1 102 may properly configure with the appropriate protocols to be able to command signaling and receive status information in communications with the wavelength switch 104. User interface device 106 also provides the user with a menu to select and command various options of automated test sequence commands to conduct the evaluation. Test results may be provided to the user in a graphical format.

Although the exemplary system 100 is shown with one optical link 136 connecting ITASWSS #1 102 to wavelength switch 104, and one optical link 138 connecting wavelength switch 104 to ITASWSS #2 102', in general, a plurality of optical input and output links, e.g., fibers, may be used to couple a plurality of optical communication ports on devices 102, 104, and 102'. Signals output from ITASWSS #1 102 may be output over ports 108 and 110. The wavelength switch 104 which may receive signals over ports 128, 130 may pass signals directly through, may interchange modulated information on wavelengths, may move modulated information to different wavelengths, e.g., the input set of wavelengths (channels) need not be the same as the output set of wavelengths. The wavelength switch 104 may output duplicate sets of input information in multiple output signals. In addition, wavelength switch 104 may intermingle some information and/or signals received on different input ports 128, 130 such that optical output port 132 conveys some of the information received on input port 128 and some of the information received on input port 130 while optical output port 134 conveys some of the information received on port 128 and some of the information received on port 130.

In some embodiments, a single ITASWSS 102 is used for wavelength switch 104 testing and evaluation. In such an embodiment, optical input ports 118, 120 may be used in place of optical input ports 118', 120', and the receiver detection, measurement, and evaluation modules in ITASWSS 102 shall be used in place of the modules in ITASWSS 102'.

In FIG. 1, switch control interface port 114' and user I/O interface 112' are shown as being unused. In some embodiments, switch control interface port 114' may also be coupled to bus 140, e.g., to monitor control signaling and use such information for configuration purposes. In some embodiments, the user I/O interface 112' may be coupled to user interface device 106 or to another user interface device, e.g., to allow operations and results pertaining to ITASWSS 2 102' to be monitored without having such information conveyed through the ITASWSS/ITASWSS ports 116, 116'.

Figure 2:
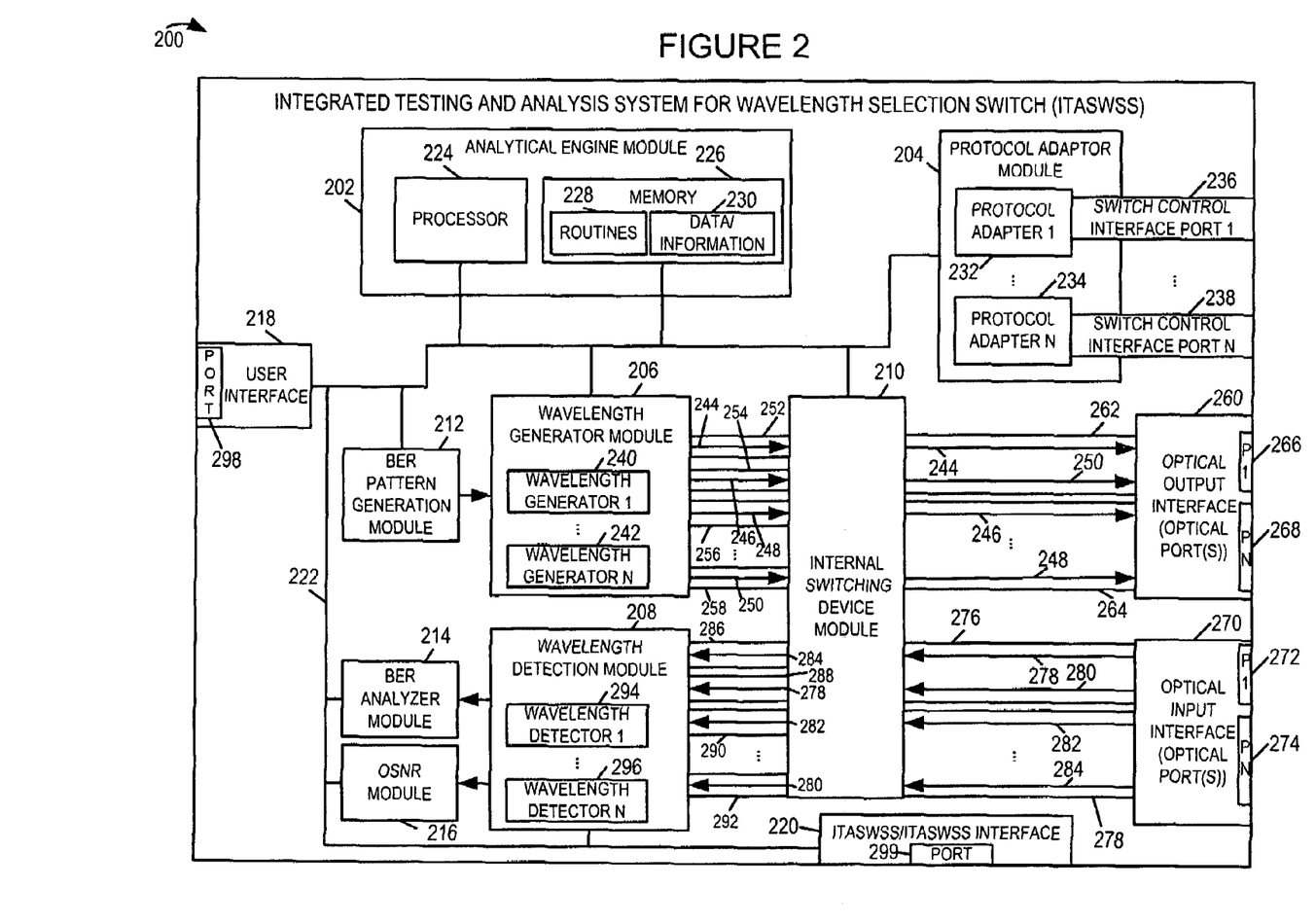
FIG. 2 is a more detailed representation of an exemplary ITASWSS unit implemented in accordance with the present invention.

FIG. 2 is a more detailed drawing of an exemplary ITASWSS 200 implemented in accordance with the present invention and using methods of the present invention. Exemplary ITASWSS 200 may be used as ITASWSS #1 102 and/or ITASWSS #2 102' in system 100 of FIG. 1. Exemplary ITASWSS 200 includes an analytical engine module 202, a protocol adapter module 204, a wavelength generator module 206, a wavelength detection module 208, an internal switching device module 210, a Bit Error Rate (BER) pattern generation module 212, a BER analyzer module 214, an Optical Signal to Noise Ratio (OSNR) module 216, a user interface 218, and an ITASWSS/ITASWSS interface 220 coupled together via bus 222 over which the various elements may interchange data and information.

The analytical engine module 202 includes a processor 224 and a memory 226, each coupled to bus 222. The analytical engine module 202 coordinates the execution of a test and/or test sequence. Memory 226 includes routines 228 and data/information 230. The processor 224, e.g., a CPU, executes the routines 228 and uses the data/information 230 in memory 226 to control the operation of the ITASWSS and implement the methods of the present invention. Operations controlled by the analytical module 202 include storing and executing testing configurations, talking to the wavelength switch 104 under test through the corresponding protocol adapter, collecting timing data, executing correlations, and enabling presentation of data through a user interface 218.

Protocol Adapter module 204 includes a plurality of protocol adapters, protocol adapter 1 232, protocol adapter N 234. Protocol adapter 1 232 is coupled to switch control interface port 1 236; protocol adapter N 234 is coupled to switch control interface port N 238. Switch control interface ports 236 or 238 may be the switch control interface port 114 of ITASWSS 1 102 in FIG. 1. Ports 236, 238 may be, e.g., an Ethernet port or a serial port. Protocol adapters 232, 234 communicate through the backplane ports of the optical switching system under test, e.g., port 122 of wavelength switch 104 in FIG. 1, and instruct the wavelength switch 104 of specific configurations needed for the test in operation. The protocol adapters 232, 234 translate either a command line input request or emulate a signaling and control protocol to instruct the wavelength switch 104 to make the appropriate connections. In some embodiments, the protocol adapters 232, 234 are programmed in the analytical engine module 202 as a series of software modules specifically tailored to each proprietary interface of a given vendor's wavelength switch 104.

Wavelength generator module 206 includes a plurality of optical signal wavelength generators, optical signal wavelength generator 1 240, optical signal wavelength generator N 242. An optical wavelength generator, 240, 242, includes a plurality of widely tunable laser supporting channels in the C band and L band, e.g., 80 to 100 channels at a 1550 nm window, as well as channels in other windows, e.g., a 1330 nm window, a 1400 nm window, a 1600 nm window. Thus optical wavelength generator 240, 242 provides a continuous spectrum of wavelengths in the testing range to simulate the typical wavelengths inputted into optical switch presently used and allowing for expansion into wavelengths planned to be used in the future. In some embodiments, the range of wavelengths available from wavelength generator module 206 may be subdivided between the plurality of wavelength generators 240, 242. Wavelength generators 240, 242 are capable of modulation and variable power. The wavelength generators 240, 242 may be controlled by the analytical engine module 202 to modulate information onto selected wavelengths at selected times thus generating a plurality of test signals. Exemplary test signals 244, 246, 248, and 250 are shown in FIG. 2. The power level of the generated test signals may also be controlled by the analytical engine module 202. The wavelength generator module 206 is coupled to internal switching device module 210 via a plurality of optical links, e.g., optical fibers, 252, 254, 256, 258 through which test signals 244, 246, 248, 250, respectively, are transmitted.

Internal switching device module 210 is coupled to the optical output interface 260 via a plurality of optical links, e.g., optical fibers, 262, 264. Optical output interface 262 includes a plurality of optical output ports, port 1 266, port N 268. Optical output port 1 266 may be port 108 of FIG. 1, while optical output port N 268 may be port 110 of FIG. 1. Port 1 266 is coupled to optical link 262, while port N 268 is coupled to optical link 264. Internal switching device 210, under the direction of the analytical engine module 202, switches received input signals 244, 246, 248, 250 to the appropriate optical port so that routing will result in the appropriate test signals being transmitted to the appropriate ports 128, 130 of the wavelength switch 104 under test. In the example shown in FIG. 2, test signals 244 and 250 have been switched onto optical link 262, while test signals 246 and 248 have been switched onto optical link 264.

ITASWSS 200 also includes an optical input interface 270 including a plurality of optical input ports, port 1 272, port N 274. Optical input port 1 272 may be port 118' of FIG. 1, while optical input port N 274 may be port 120' of FIG. 1. Test signals received as output from the unit under test, e.g., from wavelength switch 104, are received through optical input ports 272, 274. Port 1 272 is coupled via optical link 276, e.g., an optical fiber, to internal switching device module 210. Similarly, optical port N 274 is coupled to internal switching control device module 210 via optical link 278. In the example of FIG. 2, optical link 276 conveys signals 278 and 280 to switching module 210, while optical link 278 conveys signals 282, 284 to switching module 210.

The internal switching device module 210 is coupled to the wavelength detection module 208 via a plurality of optical links 286, 288, 290, 292. The wavelength detection module 208 includes a plurality of wavelength detectors, wavelength detector 1 294, wavelength detector N 296. In some embodiments, different wavelength detectors 294, 296 may cover detection for different ranges of wavelengths. Internal switching device module 210 under the direction of the analytical engine module 202 separates, groups, and/or directs the received test signals to the appropriate optical links 286, 288, 290, 292 so that the received signals may be routed to the appropriate detector 294, 296 at the appropriate time. In the example of FIG. 2, signal 284 is conveyed through optical link 286, signal 278 is conveyed through optical link 288, signal 282 is conveyed through optical link 290, and signal 280 is conveyed through optical link 292.

Optical signal wavelength detectors 294, 296 include an optical spectrum analyzer with power detection and wavelength analysis capabilities. Optical signal wavelength detectors 294, 296 are also capable of providing measurements on wavelength selective switch parameters such as directivity, isolation, cross-talk, power level, attenuation, etc.

Bit Error Rate (BER) pattern generation module 212, under the control of the analytical engine module 202, acts an input to wavelength generator module 206 and generates variable bit rate errors in the information being conveyed as test signals generated by wavelength generator module 206. BER pattern generation module 212 operates at specific bit rate ranges, e.g., 0-700 Mbps, 700-2.5 Gbps, or multi-range, and is used in the generation of test signals for measuring digital signal performance.

BER Analyzer Module 214 receives output information from the wavelength detection module 208. BER Analyzer module 214 operates at specific bit rate ranges, e.g., 0-700 Mbps, 700-2.5 Gbps, or multi-range, and is used in the analysis of received test signals for measuring digital signal performance. By detecting the received BER, and knowing the transmitted BER, degradation, e.g., due to the unit under test, e.g., wavelength switch 104, can be obtained.

Wavelength detection module 208 also directs output signals and/or information to the OSNR module 216. OSNR module 216 measures analog signal performance, e.g., optical signal to noise ratio.

User interface 218 includes a user I/O port 298 and supporting circuitry, e.g., interface drivers and receivers. User interface 218 supports interface with an operator device 106, e.g., a graphical interface device. The user I/O port 298 may be I/O port 112 of FIG. 1.

ITASWSS/ITASWSS interface 220 includes ITASWSS/ITASWSS port 299 and supporting circuitry, e.g., interface drivers and receivers. ITASWSS/ITASWSS interface 220 allows ITASWSS 200 to be coupled and communicate with other ITASWSSs, e.g., in a dual ITASWSS testing mode as shown in FIG. 1. Port 299 may be port 116 or 116' of FIG. 1.

Figure 3:
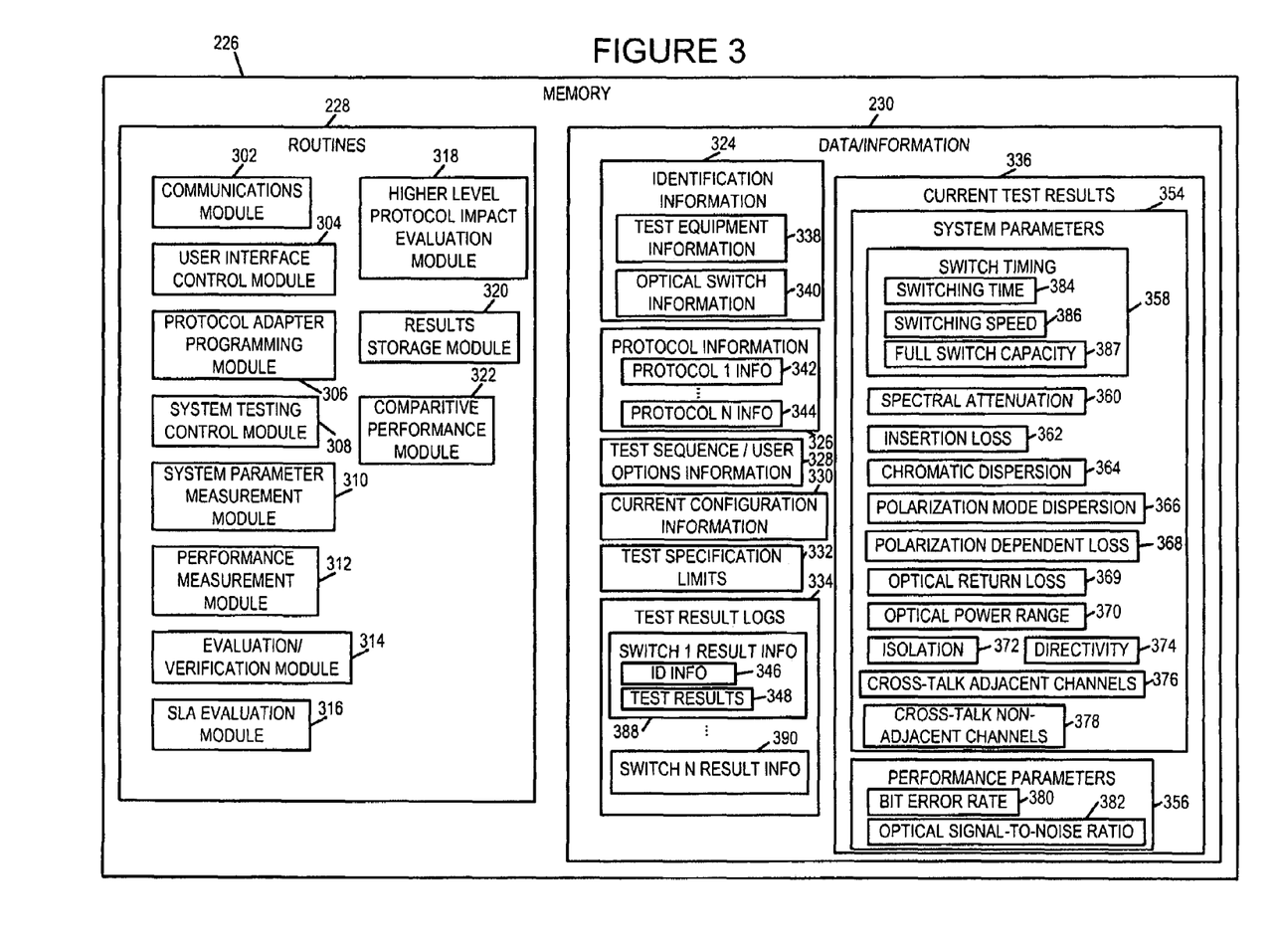
FIG. 3 is a more detailed representation of an exemplary memory that may be used in an exemplary ITASWSS unit, implemented in accordance with the present invention.

FIG. 3 is an illustration of an exemplary memory 226 that may be used in the analytical engine module 202 of exemplary ITASWSS 200 of FIG. 2 in accordance with the present invention. Memory 226 includes routines 228 and data/information 230. Routines 228 includes a communications module 302, a user interface control module 304, a protocol adapter programming module 306, a system testing control module 308, a system parameter measurement module 310, a performance measurement module 312, an evaluation/verification module 314, a SLA evaluation module 316, a higher level protocol impact evaluation module 318, a results storage module 320, and a comparative performance module 322.

Data/information 230 includes identification information 324, protocol information 326, test sequence/user options information 328, current configuration information 330, test specification limits information 332, test results logs 334, and current test results 336.

Identification information 324 includes test equipment information 338, e.g., manufacturer, model, S/N, control and ranging information, corresponding to wavelength generator 240, 242 equipment, wavelength detector 294, 296 equipment, BER modules 212, 214 equipment, and ONSR module 216 equipment that is in ITASWSS 200 and/or information pertaining to substitute equipment that may be installed in ITASWSS 200. Optical switch information 340 includes information corresponding to a plurality of optical wavelength switches from a plurality of vendors which may be tested by the ITASWSS 200 in accordance with the present invention. Optical switch information 340 may include information defining the specific protocol, e.g., a vendor specific protocol, used for the switching control, e.g., for communications over port 122 of wavelength switch 104 of FIG. 1. Optical switch information 340 also includes characteristics of the optical switch's interfaces and ports, such as physical connector used, voltage levels, frequency ranges, wavelengths, power requirements, numbers of input and output optical ports, number of channels per optical port, customer advertised switching characteristic, etc.

Protocol information 326 includes a plurality of sets of protocol information, protocol 1 information 342, protocol N information 344. Each set of protocol information 342 corresponds to a particular protocol used by a wavelength switch vendor to control the vendor's wavelength switch. In some cases, vendors may supply multiple models of switches which use the same protocol. Additional sets of protocol information may be added to protocol information 326 as different vendors offer new devices or upgraded models of wavelength switches which use different control signals and/or control protocols. Test sequence/user options information 328 includes menu information that is presented to a user, e.g., over user interface 218. Test sequence/user options information 328 includes information pertaining to predetermined sequences of tests used to characterize and/or evaluate a wavelength switch. Test sequence/user options information 328 also includes information pertaining to specific tests, e.g., a dedicated or more extensive test that may be applied to more carefully evaluate or troubleshoot one feature of the wavelength switch, e.g., cross-talk between adjacent channels.

Current configuration information 330 includes information identifying the specific test equipment presently employed in ITASWSS 200 and the specific unit under presently under test, e.g., wavelength switch 104 from manufacturer A model B S/N 123. Current configuration information 330 also includes information identifying the current test and/or test step in progress. Test specification limits 332 includes specification limits for various wavelength switches considered acceptable by the service provider and specification limits for various wavelength switches as advertised by the vendor of the wavelength switch. Such limits may correspond to parameters measured by the ITASWSS 200 such as those included in current test results 336, e.g., switching time and bit error rate.

Current test results 336 includes system parameters 354 and performance parameters 356. Current test results 336 is a set of test results obtained on the wavelength switch 104 under test and may include raw measurement data results and summarized data results. System parameters include 354 include switch timing parameters 358, spectral attenuation 360, insertion loss 362, chromatic dispersion 364, polarization mode dispersion 366, polarization dependent loss 368, optical return loss 369, optical power range 370, isolation 372, directivity 374, cross talk adjacent channels 376, and cross talk non-adjacent channels 378. Switch timing 358 includes switching time 384, switching speed 386, and full switch capacity 387. Performance parameters 356 includes bit error rate 380 and optical signal to noise ratio 382.

Test results logs 334 includes a plurality of test result logs, switch 1 result info 388 and switch N result info 390. Each log 388, 390 is a storage of information after completion of a testing session with a wavelength switch 104. Switch 1 result information 388 includes identification information 346 and test results information 348. The identification information 346 includes information identifying the wavelength switch tested by manufacturer model, and S/N. Identification information 346 also includes information identifying the specific ITAWSS or ITASWSSs used to conduct the test and the specific test equipment used in each of the ITASWSSs. Time tag information indicating the date and time of the testing session is also included in the identification information 346. Test results information 348 is a copy and/or a processed version of the current test results 336 obtained at the completion of the testing session.

Communication module 302 uses the data/information 230 in memory 226 to control signaling between the various elements of ITASWSS 200 and to control ITAWSS/ITAWSS communications. User Interface control module 304 controls operation of user interface 218 allowing a user, e.g., with a graphical interface, to configure the ITASWSS, select and command testing options from a menu, view and evaluate test results obtained, view test results in relation to specifications, request summarizations of test results, tailor the test sequence, comparatively evaluate multiple test results from one or more tested wavelength switches, e.g., corresponding to different manufacturers, to input new protocol information, and to input new wavelength switch type information.

Protocol adapter programming module 306 uses information in data/information 230 such as optical switch information 340, current configuration information 330, and protocol information 342 to match up the specific unit under test, e.g. specific wavelength switch 104, with the appropriate protocol and then to program one of the protocol adapters 232, 234 with a specially tailored software module corresponding to the proprietary interface of the specific vendor's wavelength switch 104 to be tested. After the protocol adapter 232, 234 is programmed, the analytical engine module 202 can send standard signals using its own internal protocol to issue a specific switching control command, and the protocol adapter 232, 234 will convert the command to an equivalent command or commands in the switch vendor's protocol so that test instructions may be understood and executed by the vendor's wavelength switch 104. In addition, result signaling from the wavelength switch 104 such as fault information and status information is converted from the wavelength switch vendor's protocol to the ITASWSS system internal protocol, by the protocol adapter 232, 234, so that such information may be recovered and understood by analytic engine module 202.

System testing control module 308 provides overall control of the user selected testing. Operations of module 308 include controlling the wavelength generator module 206, controlling the internal switching device module 210, sending switching signals to the protocol adapter module 204, and coordinating overall timing. System parameter measurement module 310 uses information in data/information 230, and controls the wavelength detection module 208 to obtain system parameter information 354. System parameter measurement module 310 may perform processing of some of the data output from the wavelength detection module 208 to obtain some of the system parameters 354.

Performance measurement module 312 controls operation of the BER pattern generation module 212, BER analyzer module 214, and OSNR module 216 to obtain performance parameters 356 such as BIT error rate 380 and optical signal to noise ratio 382 for the wavelength switch 104 under test.

Evaluation/verification module 314 compares a set, or partial set, of results, e.g., current test result 354, against test specification limits 332. For example, the results may be compared to be displayed in a graphical format, e.g., bar graphs, for a user. An obtained current testing result value such as switching time 384 may be plotted on the same graph with the specification limit acceptable to the service provider and the specification limit advertised by the switch vendor.

Evaluation/verification test module 314 can generate warning indications during or after the testing to clue the user to focus on potential trouble areas for additional specialized testing. In addition evaluation/verification module 314 can generate overall evaluation reports.

SLA evaluation module 316 generates evaluation information based on a calculation of percent of error free parameters derived from the BER measurements. SLA evaluation module 316 analyzes the impact of selected parameters on the performance of the switch, e.g., percent availability, blocking rate. Such evaluation information generated by SLA evaluation module 316 can be presented to the user, e.g., graphically, through the user interface 218, output to an external higher level system, e.g., through user interface 218, for SLA estimation in higher level protocols, e.g., Transmission Control Protocol/Internet Protocol (TCP/IP), and/or forwarded to the higher level protocol impact evaluation module 318.

Higher level protocol impact evaluation module 318 uses forwarded information pertaining to the wavelength switch to evaluate the impact on the higher level protocols that may be used on signals traversing the wavelength switch.

Results storage module 320 transfers current test information 336, and relevant information from identification information 324 and current configuration information 330 into a result test logs 334 information set, e.g., switch n result information 390. Comparative performance module 322 allows a user to select information from two or more test result logs 388, 390 and obtain a comparison. In some embodiments, comparison reports and/or displays are generated automatically as part of the testing process. Such comparisons may be used to distinguish between two wavelength switch vendors in competition, to evaluate a population of wavelength switches supplied by the same vendor, to evaluate a new model switch by the same vendor, and/or to evaluate the same S/N wavelength switch for any degradation due to aging.

Figures 4, 4A:
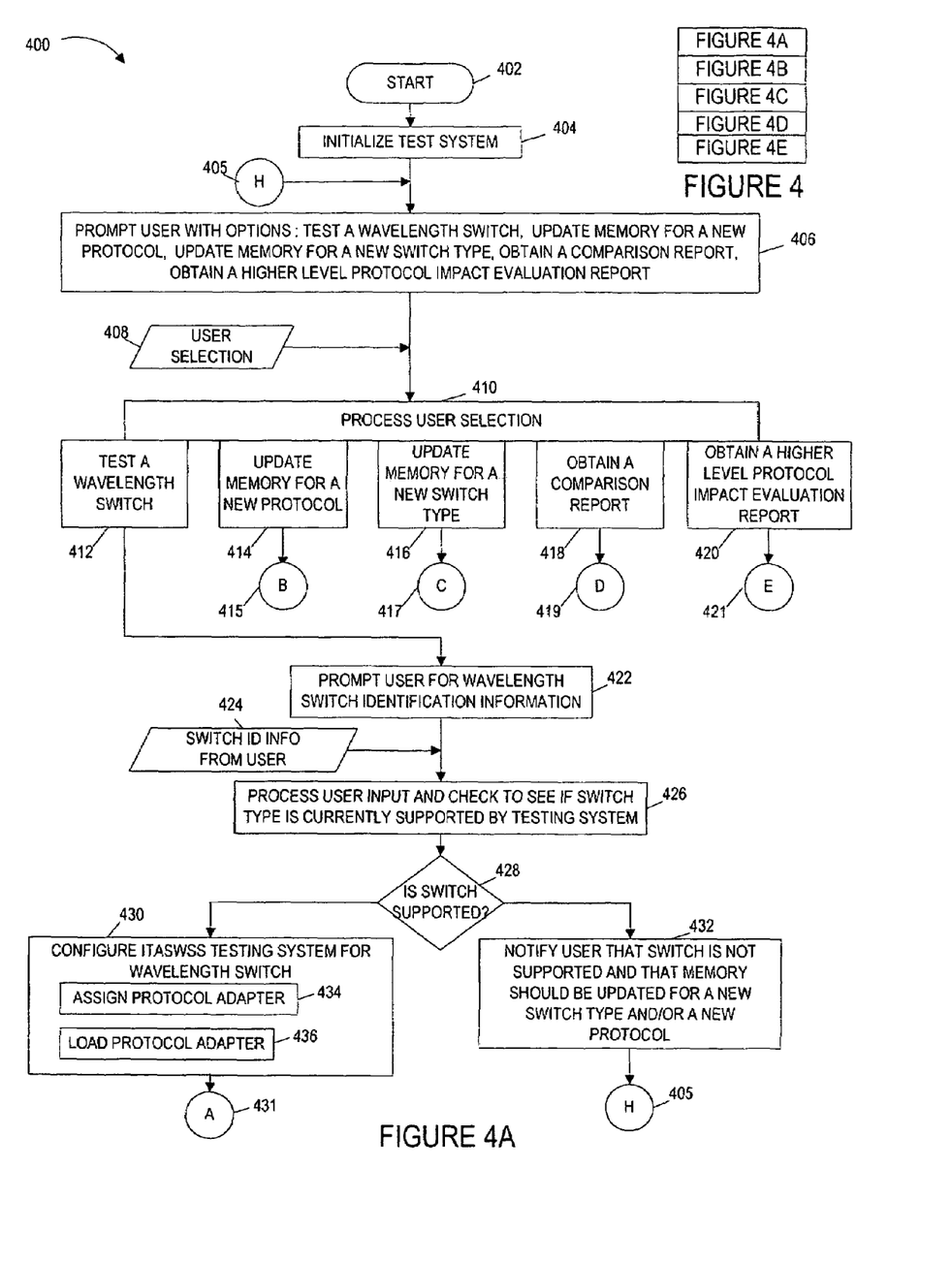
FIG. 4, which comprises the combination of FIGS. 4A-4E, is a flowchart of an exemplary method of operating an exemplary automated DWDM wavelength switch testing system in accordance with the present invention.
Figure 4B:
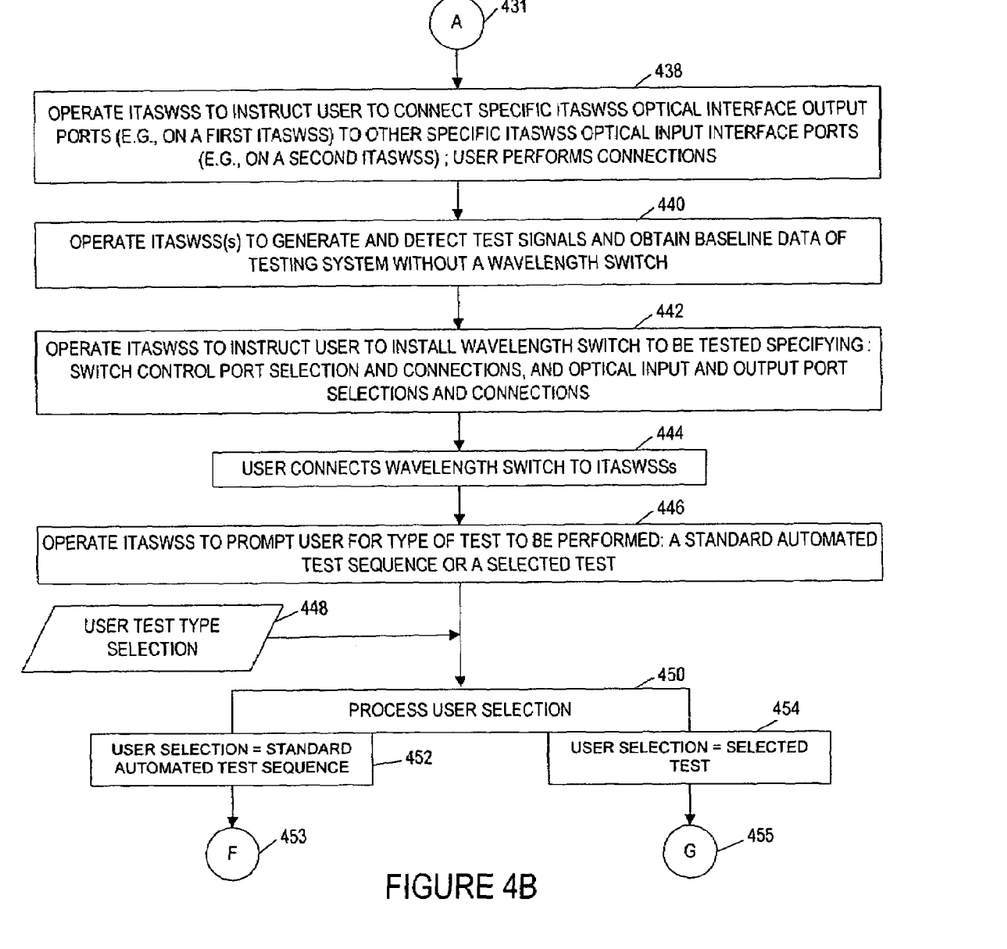
Figure 4C:
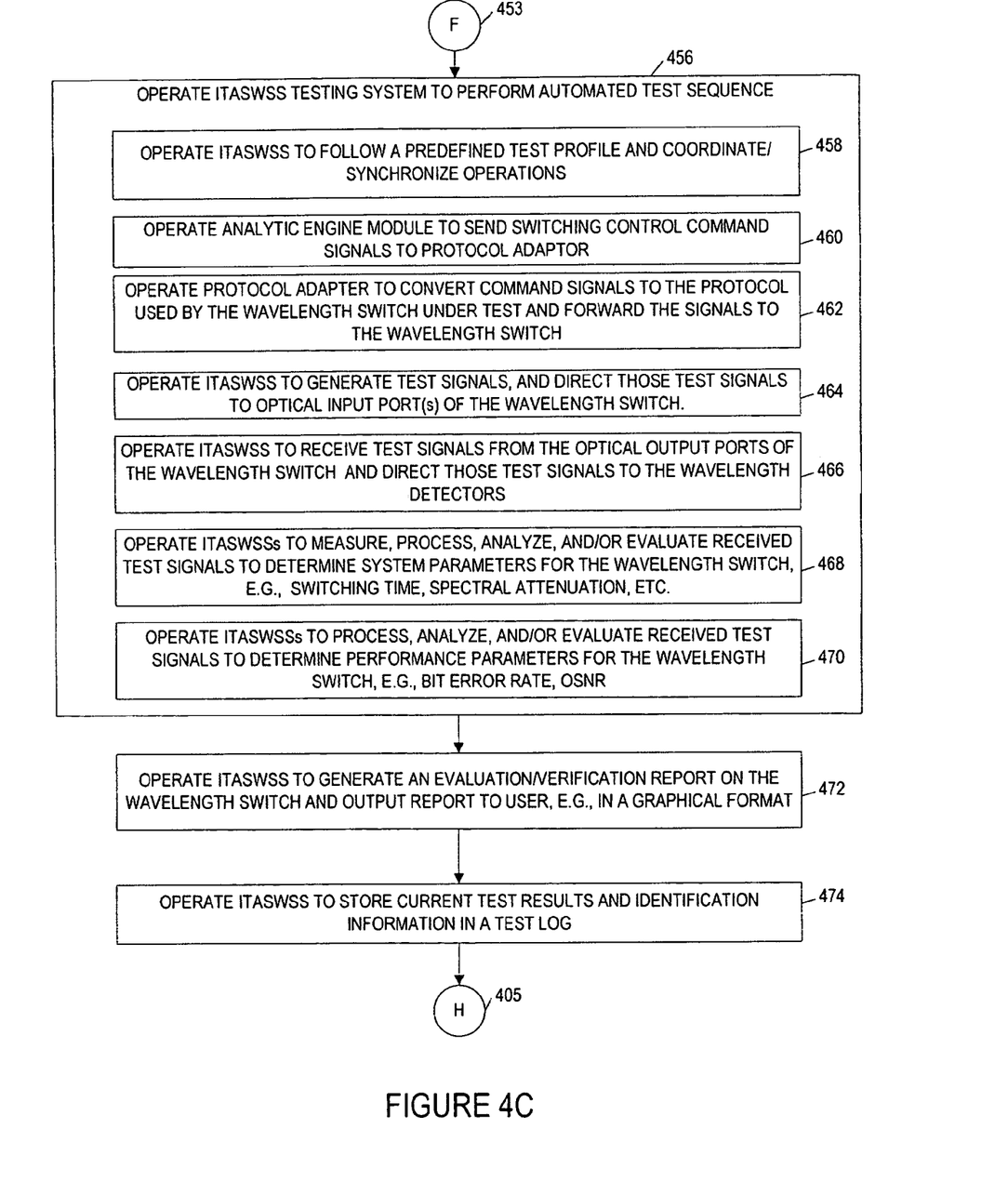
Figure 4D:
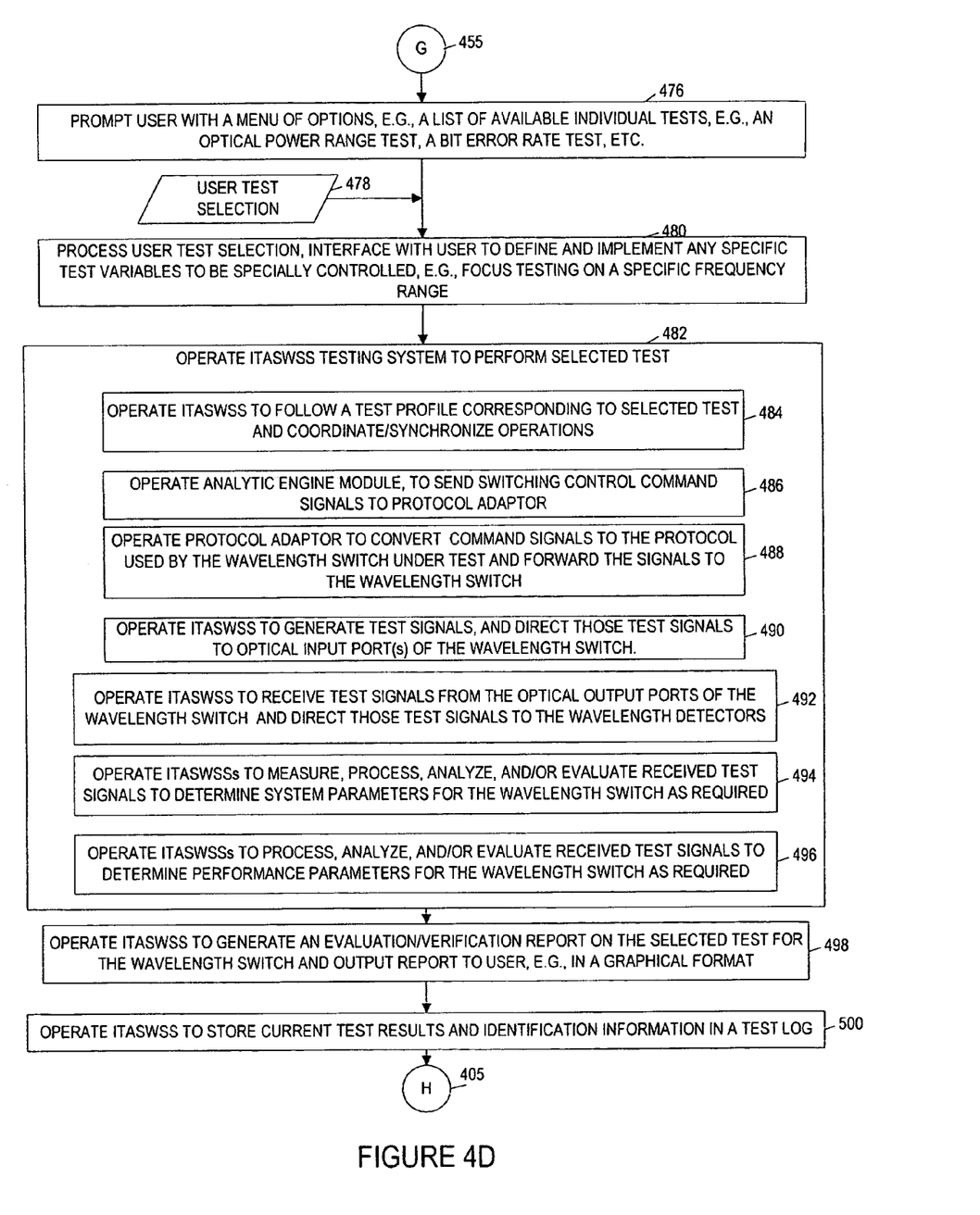
Figure 4E:
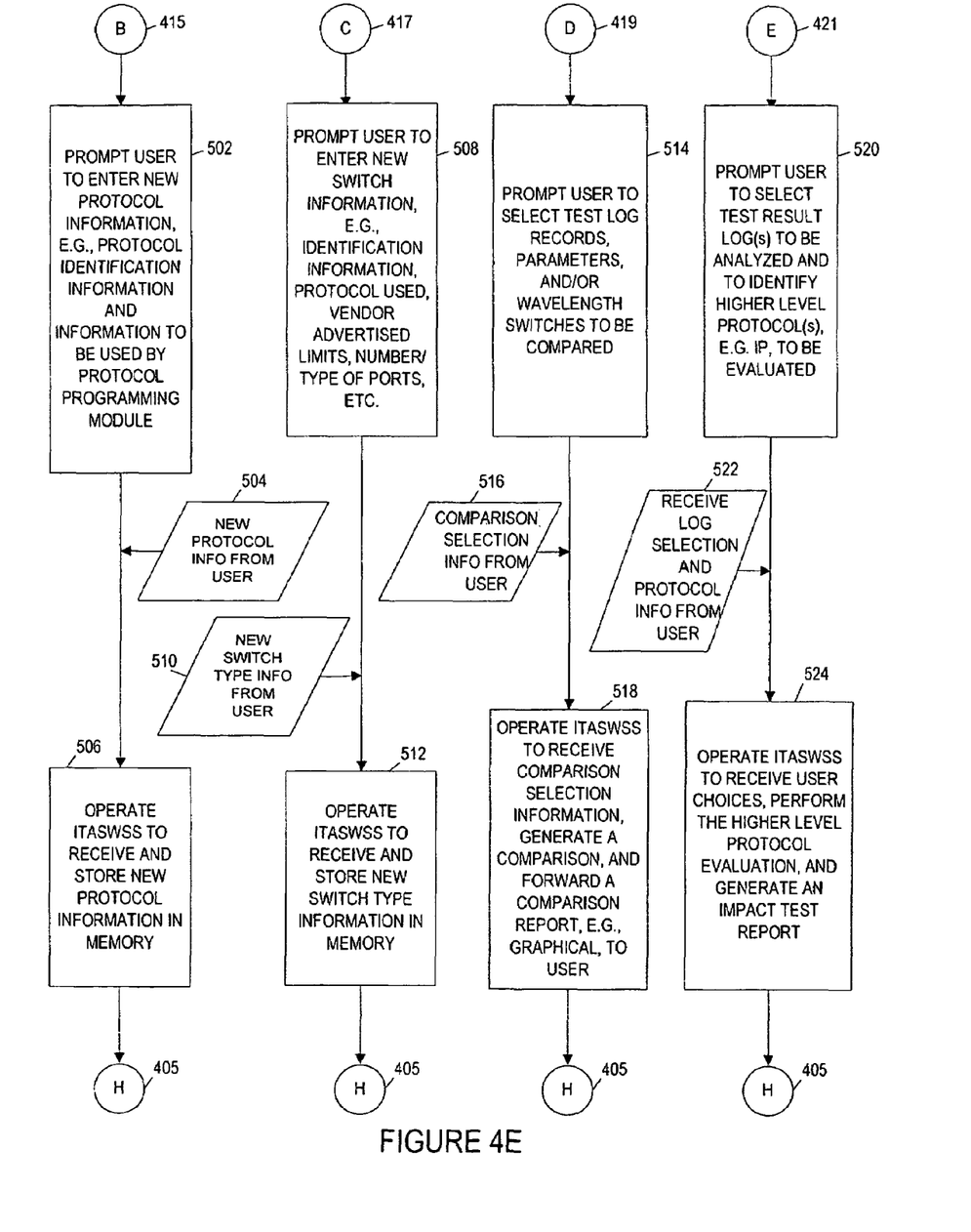

FIG. 4 is a flowchart 400 of an exemplary method of operating a wavelength switch testing system, e.g., exemplary testing system 100, in accordance with the present invention. Operation starts at step 402 and proceeds to step 404, where the test system is initialized, e.g., the ITASWSS(s) 102, 102' and user interface device 106 are powered on and communications are established. Operation proceeds to step 406, where the test system is operated to prompt the user with options: test a wavelength switch, update memory for a new protocol, update memory for a new switch type, obtain a comparison report, or obtain a higher level protocol impact evaluation report. The user chooses an option and inputs a user selection 408 via user interface device 106. Then, in step 410, ITASWSS 102 receives user selection 408 and processes the user selection. If the selection is to test a wavelength switch 412, then operation proceeds to step 422. If the selection is to update memory for a new protocol 414, then operation proceeds via connecting node B 415 to step 502. If the selection is to update memory for a new switch type 416, then operation proceeds via connecting node C 417 to step 508. If the selection is to obtain a comparison report 418, then operation proceeds via connecting node D 419 to step 514. If the selection is to obtain a higher level protocol impact evaluation report 420, then operation proceeds via connecting node E 421 to step 520.

Assuming that a wavelength switch is to be tested, operation proceeds to step 422, where the test system prompts the user for wavelength switch identification information, e.g., vendor, P/N, model, S/N, software release version, etc. The user inputs switch ID information 424 into the user interface device 106 and in step 426 the testing system processes the user input 424 and checks to see if the switch type is currently supported by the testing system. For example, ITASWSS 102 can check in its memory 226 to see if there is a corresponding entry matching the vendor, P/N, model number, and software release version. Then in step 428 the operation is directed based upon the result of the check. If the switch is currently supported, then operation proceeds from step 428 to step 430 where the ITASWSS testing system is configured for the specific type of wavelength switch 104 to be tested. Step 430 includes sub-step 434 in which ITASWSS 102 user interface control module 304 assigns an appropriate protocol adapter 232, 234 to support communications with the wavelength switch 104. Different protocol adapters 232, 234 may support the loading of different protocol conversion information, and different protocol adapters 232, 234 may have different physical switch control interface ports, e.g., a serial communications (RS-232) port versus a network connection (Ethernet) port. Step 430 also includes sub-step 436, where the ITASWSS's 102 protocol adapter programming module 306 selects the appropriate protocol information 342, 344, matching the protocol used by the wavelength switch 104 to be tested, and programs the selected protocol adapter, e.g., protocol adapter 1 232. However, if the wavelength switch 104 is not currently supported, then operation proceeds from step 428 to step 432, where the ITASWSS 102 notifies the user that the wavelength switch 104 is not currently supported and that ITASWSS memory should be updated for a new switch type and/or a new protocol. From step 432 operation proceeds via connecting node H 405 back to step 406, where the user is prompted with input options.

From step 430, operation proceeds via connecting node A 431 to step 438, where the ITASWSS 102 is operated to instruct the user to connect specific ITASWSS optical interface output ports 108, 110, e.g., on a first ITASWSS 102, to other specific ITAWSS optical input interface ports 118', 120', e.g., on a second ITASWSS 102', and the user performs the connections. Then, in step 440, the ITASWSS 102 is operated to generate test signals, and ITASWSS 102' is operated to detect test signals and obtain baseline data of the testing system without a wavelength switch. The information obtained in step 440 may be used to calibrate the system, so that observed changes in test signals due to the wavelength switch 104 may be isolated from observed changes in test signals due to the testing system itself.

Next, in step 442, the ITASWSS 102 is operated to instruct the user to install the wavelength switch 104 to be tested specifying: switch control port selection and connections, and optical input and output port selections and connections. In step 444, the user connects the wavelength switch 104 to be tested to the testing system as instructed. Next, in step 446, the ITASWSS 102 is operated to prompt the user to select the type of test to be performed: a standard automated test sequence or a selected test. User test type selection input 448 is received and processed by the ITASWSS 102 in step 450. If the user selection=standard automated test sequence (452) operation proceeds via connecting node F 453 to step 456; however, if the user selection=a selected test (454) then operation proceeds via connecting node G 455 to step 476.

If operation proceeds to step 456, then the ITASWSS is operated to perform the automated test sequence. Step 456 includes sub-steps 458, 460, 462, 464, 466, 468, and 470. In sub-step 458 the ITASWSS 102 is operated under the direction of the system testing control module 308 to follow a predefined test profile and coordinate/synchronize operations internally, with wavelength switch 104, and with second ITASWSS 102'. In sub-step 460, the analytic engine module 202 in ITASWSS 102 sends switching control command signals to the protocol adapter in use, e.g., protocol adapter 232. In sub-step 462, the protocol adapter is operated to convert received command signals from the protocol used by the analytic engine module 202 to the protocol used by the wavelength switch under test. Then the converted signals are forwarded to the wavelength switch 104. In sub-step 464, ITASWSS 102 is operated to generate test signals, e.g., using wavelength generator module 206 and BER pattern generator module 212, and to direct those test signals, e.g., by controlling internal switching device module 210, to optical input port(s) of the wavelength switch. In sub-step 466, ITASWSS 102' is operated to receive test signals from the optical output ports of the wavelength switch 104, and direct those test signal, e.g., by controlling its internal switching device module 210, to its wavelength detectors 294, 296. In sub-step 468, the ITASWSSs 102, 102' are operated using their system parameter measurement modules 310 to measure, process, analyze and/or evaluate received test signals to determine system parameters for the wavelength switch, e.g., switching time, spectral attenuation, etc. In sub-step 470, the ITASWSSs 102, 102' are operated using performance measurement modules 312 to control the BER analyzer module 214 and OSNR module 216 in ITASWSS 102, and to process, analyze and/or evaluate received test signals to determine performance parameters for the wavelength switch, e.g., bit error rate and OSNR.

Operation proceeds from step 456 to step 472. In step 472, ITASWSS 102 is operated so that its evaluation verification module 314 generates an evaluation/verification report on the wavelength switch 104 under test and outputs the report to the user, e.g., in a graphical format. The evaluation verification module 314 compares test specification limits 332 to current test results 336. Then in step 474, the ITASWSS 102 stores current test results 336 and identification information, e.g., identification information included in current configuration information 330 in a test log, corresponding to a testing session, in test results log 334. Operation proceeds from step 474 via connecting node H 405 back to step 406 to again prompt the user with available options.

Returning to step 450, if the user selection=a selected test (454) then operation proceeds via connecting node G 455 to step 476. In step 476, the user is prompted with a menu of options, e.g., a list of available individual tests, e.g., an optical power range test, a bit error rate test, etc. Next, in step 480 user test selection 478 is received and processed by ITASWSS 102. In addition, in step 480 there may be additional information exchanges between the user and ITASWSS 102 to define and implement any specific test variables to be specially controlled, e.g., focus testing on a specific frequency range, a specific optical port, etc. Next, in step 482, the ITASWSS testing system is operated to perform the selected test. Step 482 includes sub-steps 484, 486, 488, 490, 492, 494, and 496. In sub-step 484, ITASWSS 102 is operated to follow a test profile corresponding to the selected test and to coordinate/synchronize operations, e.g., with internal components, with ITASWSS 102', and with wavelength switch 104. In sub-step 486, analytic engine module 202 of ITASWSS 102' is operated to send switching control command signals to a protocol adapter, e.g., protocol adapter 232. In sub-step 488, the protocol adapter is operated to convert command signals from the protocol used internally for signaling within the ITASWSS 102 to the protocol used to by the wavelength switch 104 under test and to forward those signals to the wavelength switch 104.

In sub-step 490, ITASWSS 102 is operated to generate test signals, e.g., using its wavelength generator module 206 and/or BER pattern generator module 212, and to direct those test signals, e.g., by controlling its internal switching device module 210, to optical input port(s) of the wavelength switch. In sub-step 492, ITASWSS 102, is operated to receive test signals from the optical output ports of the wavelength switch 104, and direct those test signal, e.g., by controlling its internal switching device module 210, to its wavelength detectors 294, 296. In sub-step 494, the ITASWSSs 102, 102' are operated using system parameter measurement modules 310 to measure, process, analyze and/or evaluate received test signals to determine system parameters for the wavelength switch, e.g., switching time, spectral attenuation, etc, as required by the specific test being performed. In sub-step 496, the ITASWSSs 102, 102' are operated using performance measurement modules 310 to control the BER analyzer module 214 and OSNR module 216 in ITASWSS 102' and to process, analyze and/or evaluate received test signals to determine performance parameters for the wavelength switch, e.g., bit error rate and OSNR, as required by the specific test being performed.

Operation proceeds from step 482 to step 498. In step 498, ITASWSS 102 is operated so that its evaluation verification module 314 generates an evaluation/verification report on the wavelength switch 104 under test and outputs the report to the user, e.g., in a graphical format. The evaluation verification module 314 compares test specification limits 332 to current test results 336. Then in step 500, the ITASWSS 102 stores current test results 336 and identification information, e.g., identification information included in current configuration information 330 in a test log, corresponding to a testing session, in test results log 334. Operation proceeds from step 500 via connecting node H 405 back to step 406 to again prompt the user with available options.

Returning to step 410, if the user selection 408 is a request to update memory for a new protocol (414), then operation proceeds via connecting node B 415 to step 502. In step 502, the user is prompted to enter new protocol information, e.g., protocol identification information and information used by the protocol programming module. The protocol identification information may also include information cross referencing the protocol to various vendor/models of wavelength switches. In some embodiments, the information includes developed software modules, e.g., conversion modules, for the new protocol, which can be transferred into the ITASWSS memory 324 as part of a protocol information set of information, e.g., protocol N information 344. In such an embodiment, the stored software module may subsequently be transferred, e.g., by the protocol adapter programming module 306 into a protocol adapter, e.g., protocol adapter 232, when required by testing. Operation proceeds from step 502 to step 506. In step 506, the ITASWSS 102 is operated to receive and store the new protocol information from the user 504 in its memory 226. New protocol information received by ITASWSS 102 is transferred to ITASWSS 102', where the information is also stored. Operation proceeds from step 506 via connecting node H 405 back to step 406 to again prompt the user with available options.

Returning to step 410, if the user selection 408 is a request to update memory for a new wavelength switch type (416), then operation proceeds via connecting node C 417 to step 508. In step 508, the user is prompted to enter new switch information, e.g., identification information, protocol used, vendor advertised limits, number/type of ports, etc. Next, in step 512, the ITASWSS 102 is operated to receive and store the new wavelength switch type information from the user 510 in its memory 226. Updated wavelength switch information received by ITASWSS 102 is transferred to ITASWSS 102', where the information is also stored. Operation proceeds from step 512 via connecting node H 405 back to step 406 to again prompt the user with available options.

Returning to step 410, if the user selection 408 is a request to obtain a comparison report (418), then operation proceeds via connecting node D 419 to step 514. In step 514, the user is prompted to select test log records 338, 390, parameters, and/or wavelength switches, e.g., by S/N, model, vendor, etc., to be compared. Next, in step 518, the ITASWSS 102 is operated to receive comparison selection information from the user 516, generate a comparison report under the direction of comparison performance module 322, and forward a comparison report to the user, e.g., in a graphical format. Operation proceeds from step 518 via connecting node H 405 back to step 406 to again prompt the user with available options.

Returning to step 410, if the user selection 408 is a request to obtain a higher level protocol impact evaluation report (418), then operation proceeds via connecting node E 421 to step 520. In step 520, the user is prompted to select a test result log(s) to be analyzed and to identify higher level protocol(s) to be evaluated. The higher levels protocol(s) are protocols, e.g., Asynchronous Transfer Mode (ATM), Transmission Control Protocol/Internet Protocol (TCP/IP) or higher level application protocols or services, e.g., Voice over Internet Protocol (VoIP), that may be used by the service provider's network to convey information through a deployed wavelength switch. Next, in step 524, the ITASWSS 102 is operated to receive test result log selection and higher level protocol information from the user 522, perform a higher level protocol evaluation under the direction of module 318, and forward an impact report to the user. Operation proceeds from step 524 via connecting node H 405 back to step 406 to again prompt the user with available options.

What is claimed is:

1. An optical switch testing system for testing an optical switch, the system comprising:
   a first automated test apparatus including:
   i) a user interface module configured to receive optical switch configuration and testing information from a user of said first automated test apparatus;
   ii) a first plurality of sets of switch control protocol information, each set of switch control protocol information corresponding to a different optical switch control protocol, said plurality of sets of switch control protocol information including a first set of switch protocol information corresponding to a first optical switch control protocol and a second set of optical switch protocol information corresponding to a second optical switch control protocol which is different from said first optical switch control protocol; and iii) a first protocol adapter module adapted to load information from said first set of switch control protocol information, to receive said switch configuration and testing information generated from said user interface module, and to generate switch control signals in accordance with said configuration and testing information in a format that complies with said first optical switch control protocol.

2. The system of claim 1, wherein said information loaded from said first set of switch control protocol information includes information included in said first set of switch control protocol information or derived from processing information included in said first set of switch control protocol information.

3. The system of claim 2, wherein said first automated test apparatus further includes:
a display; and
wherein said user interface module provides a graphical user interface on said display for controlling said first automated test apparatus.

4. The system of claim 1, wherein said first and second optical switch control protocols correspond to two different optical switch manufacturers.

5. The system of claim 4, wherein said first and second optical switch protocols use different commands to perform the same optical switching control operation, said first protocol adapter module generating a switch command in response to a user input signal as a function of the set of switch control protocol information used to load said first protocol adapter module.

6. The system of claim 1, wherein said first automated test apparatus further includes:
a user interface configured to load switch control protocol information into said first protocol adapter module in response to control information from a user indicating a particular optical switch control protocol to be used.

7. The system of claim 1, wherein said first automated test apparatus further includes:
a wavelength generator module connected to said first protocol adapter module configured to generate signals at one or more selected wavelengths.

8. The system of claim 7, wherein said wavelength generator module generates signals of said selected wavelengths using at least one of selected modulation signals and selected power levels.

9. The system of claim 7, wherein said first automated test apparatus further includes:
a wavelength detector module including an optical spectrum analyzer with power detection and wavelength analysis capabilities.

10. The system of claim 9, wherein said first automated test apparatus further includes:
an internal switching device connected to said wavelength generator module used to direct signals of a selected wavelength to an optical port selected to be used for outputting said selected wavelength.

11. The system of claim 9, wherein said internal switching device further directs received signals from an optical switch under test to signal detectors included in said detector module.

12. The system of claim 11, wherein said first automated test apparatus further includes:
an optical signal to noise ratio measurement module connected to said detector module configured to measure an analog optical signal to noise ratio in an optical signal passed through said optical switch under test.

13. The system of claim 9, wherein said first automated test apparatus further includes:
a bit error rate testing module connected to said wavelength generator module configured to generate variable bit error rates; and
a bit error rate analyzing module connected to said wavelength generator module to determine a signal bit error rate of an optical signal passed through the optical switch under test.

14. The system of claim 12, wherein said first automated test apparatus further includes:
a programmable analyzer module connected to said wavelength detector module configured to analyze optical switch test results to determine optical switch performance characteristics and to compare said performance characteristics with a set of performance standards.

15. The system of claim 9, wherein said first automated test apparatus further includes:
means connected to said wavelength detector module configured to test at least four of:
switching time, spectral attenuation, insertion loss, chromatic dispersion, polarization mode dispersion, polarization dependent loss, optical return loss, optical power range, optical isolation, directivity, cross-talk between adjacent optical channels, and cross-talk between non adjacent channels.

16. The system of claim 9, wherein said first automated test apparatus further includes:
means connected to said wavelength detector module for estimating the impact that detected optical switching impairments will have on higher layer protocols.

17. The system of claim 16, where said higher layer protocols is one of TCP/IP, ATM, Frame Relay and Ethernet.

18. The system of claim 9, wherein said first automated test apparatus further includes:
means connected to said wavelength detector module for estimating the impact that detected optical switching impairments will have on a communications service.

19. The system of claim 18, wherein said service is one of a VoIP service, a video service and a data service.

20. The system of claim 7, wherein said first automated test apparatus further includes:
an optical output port configured to communicate dense wavelength division multiplexed optical test signals from said wavelength generator module to a dense wavelength division multiplexed optical switch under test, said multiplexed optical signals including light of at least 32 different wavelengths.

21. The system of claim 20, further comprising:
a second automated test apparatus including:
i) a user interface module configured to receive optical switch configuration and testing information from a user of said first automated test apparatus;

ii) a second plurality of sets of switch control protocol information, each set of said second plurality of switch control protocol information corresponding to a different optical switch control protocol, said second plurality of sets of switch control protocol information including the first set of switch protocol information corresponding to the first optical switch control protocol;

iii) a detection module configured to detect optical signals output by said optical switch under test; and iv) a testing unit interface module connected to said user interface module, said second plurality of sets of switch control protocol information, and said detection module, said testing unit interface module used to couple said second automated test apparatus to said first automated test apparatus.

22. The system of claim 21, wherein one of said first and second automated test apparatus include:

an analyzer module configured to analyze test results detected by said detection module included in said second automated test apparatus configured to generate a report of test results.

* * * * *